June 11, 1968 W. H. MOORE 3,387,719
COUNTER AND BUNDLE EJECTOR
Filed April 5, 1965 8 Sheets-Sheet 1

INVENTOR.
WILLIAM H. MOORE
BY
ATTORNEYS

INVENTOR.
WILLIAM H. MOORE
BY
ATTORNEYS.

June 11, 1968  W. H. MOORE  3,387,719
COUNTER AND BUNDLE EJECTOR
Filed April 5, 1965  8 Sheets-Sheet 6

INVENTOR.
WILLIAM H. MOORE
BY
Seidel & Gonda
ATTORNEYS.

June 11, 1968 W. H. MOORE 3,387,719
COUNTER AND BUNDLE EJECTOR
Filed April 5, 1965 8 Sheets-Sheet 7

INVENTOR.
WILLIAM H. MOORE
BY
*Seidel & Gonda*
ATTORNEYS.

INVENTOR.
WILLIAM H. MOORE
BY
ATTORNEYS.

United States Patent Office 3,387,719
Patented June 11, 1968

3,387,719
COUNTER AND BUNDLE EJECTOR
William H. Moore, Oreland, Pa., assignor, by mesne assignments, to The Langston Company, a corporation of New Jersey, a wholly owned subsidiary of Harris-Intertype Corporation, Camden, N.J., a corporation of Delaware
Filed Apr. 5, 1965, Ser. No. 445,393
22 Claims. (Cl. 214—6)

ABSTRACT OF THE DISCLOSURE

Sheet material is transferred from the bottom of a top feed hopper to the bottom of a bottom feed hopper wherein the blanks are accumulated into stacks of a predetermined number and then removed from the bottom feed hopper.

This invention relates broadly to a bundle counter and ejector for counting folded and glued (or taped) paperboard box blanks, accumulating the blanks in a vertical stack until a predetermined number has been accumulated, and then ejecting the blanks as a bundle.

Heretofore, two basic types of bundle counters and ejectors have been proposed. The first general type may be referred to as the type having an over-the-top feed and the second type may be referred to as having an underneath feed. The first general type involves a machine which can be a self-contained machine since it does not have to be driven or timed with a folder-gluer from which the blanks are fed thereto. However, this machine generally requires an electronic counting device controlled by an electric eye which in turn controls air cylinders which trip and dump the bundle to be ejected when the predetermined number of box blanks has been accumulated. The bundle which has been dumped is ejected from underneath the stack which is being formed.

The underneath feed type machine must be driven by and timed with the folder-gluer machine. This type of machine does not require any electronic counting device. After a predetermined and preset number of box blanks have been accumulated, a continuously operating ejector mechanism ejects the bundle from above the stack being formed.

Each of the two general types discussed above have advantages and disadvantages. The present invention is believed to have the advantages of the above-mentioned types while at the same time eliminating the disadvantages associated therewith and which may be enumerated as follows:

(1) The first type of machine requires elaborate and expensive electronic equipment which requires substantial down time for maintenance and repair;

(2) The first type of machine frequently has malfunctions when small blanks are being stacked since small blanks do not stack up properly;

(3) The elevating screws used on the second type of machine must be changed each time the box blanks are made of a different thickness of paperboard;

(4) The second type of machine frequently has malfunctions due to ejection of bundles containing an incorrect quantity of box blanks due to the fact that ejector bar does not always contact the correct box blank at the beginning of the ejecting cycle;

(5) In the second type of machine, a malfunction in the number of box blanks ejected as a bundle may occur due to the fact that the box blanks are not fed continuously.

In addition to retaining the advantages of the above-mentioned types of machines and eliminating the disadvantages thereof, the present invention has additional advantages. Elaborate and expensive electronic equipment is not required in connection with the present invention. There are no intermittent motions for bundle ejection cycles and no changes are required to accommodate box blanks of various thicknesses.

Other advantages of the present invention also include means to permit the apparatus to operate as a self-contained unit without being driven by or timed with the folder-gluer regardless of whether or not box blanks are fed thereto from the folder-gluer at a regular rate. The box blank lifters contact a large area of the box blank for more effective lifting without sagging of the box blanks and adjustments may be rapidly made to accommodate different size blanks.

It is an object of the present invention to provide a novel bundle counter and ejector apparatus.

It is another object of the present invention to provide apparatus which will accurately accumulate a predetermined bundle of box blanks and eject the same.

It is another object of the present invention to provide a bundle counter and ejector which is a self-contained unit capable of operating at a speed which need not be exactly timed or synchronized with the speed at which box blanks are delivered thereto.

It is another object of the present invention to provide novel apparatus and method for counting and ejecting bundles of box blanks delivered thereto at a regular or irregular rate.

It is another object of the present invention to provide a bundle counter and ejector apparatus and method capable of accommodating various sized box blanks of various thicknesses in a manner which is reliable, simple, rapid and easy to maintain.

Other objects will appear hereinafter.

For the purpose of illustrating the invention, there are shown in the drawings forms which are presently preferred; it being understood, however, that this invention is not limited to the precise arrangements and instrumentalities shown.

FIGURES 6–9 inclusive are diagrammatic illustrations of the accumulation and ejection of a bundle of box blanks.

FIGURE 10 is a schematic wiring diagram for the means which senses the level of blanks in the first hopper.

Figure 11:
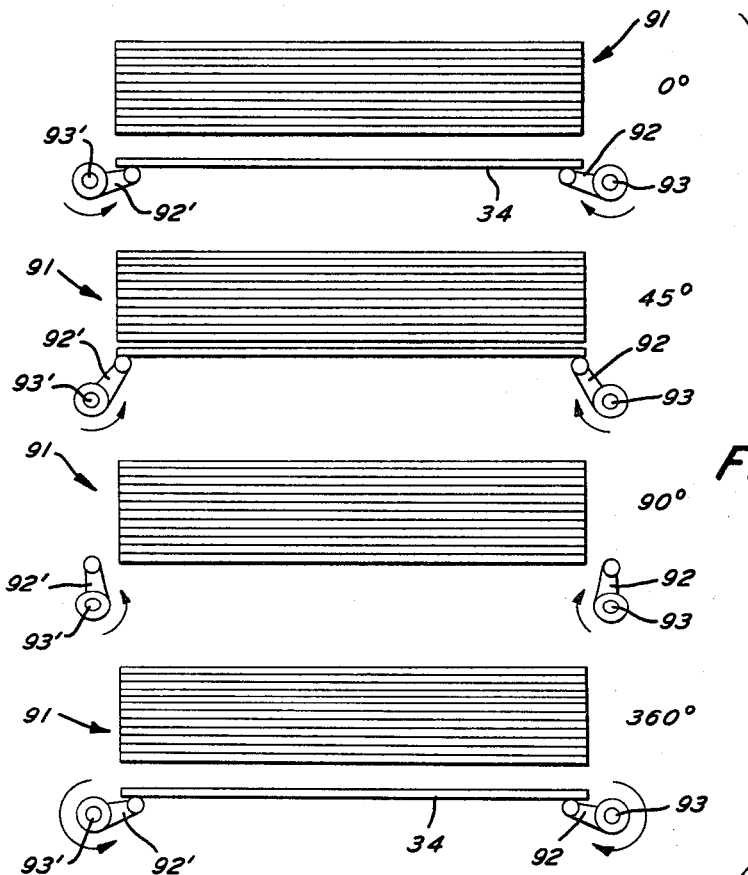

FIGURE 11 is a diagrammatic illustration of the manner in which bottom feed stacking is accomplished.

Figure 12:
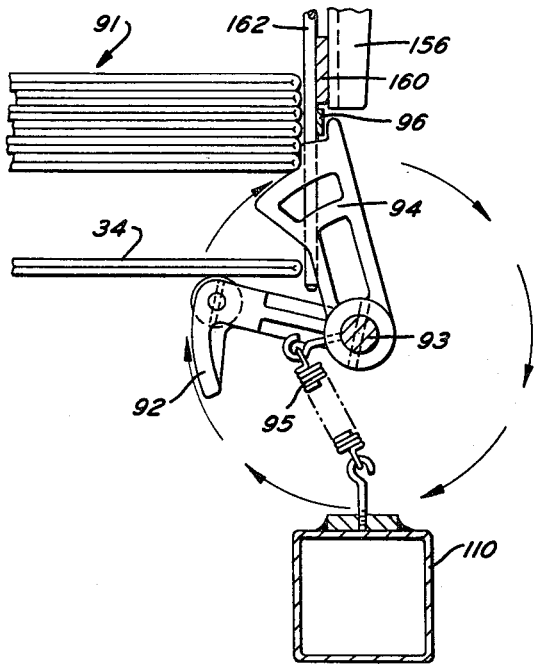

FIGURE 12 is an enlarged detail view of components of the machine of the present invention.

Figure 13:
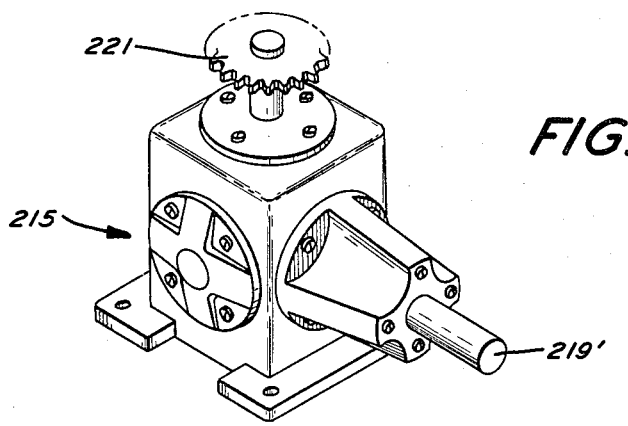

FIGURE 13 is a perspective view of a gear box.

Figure 14:
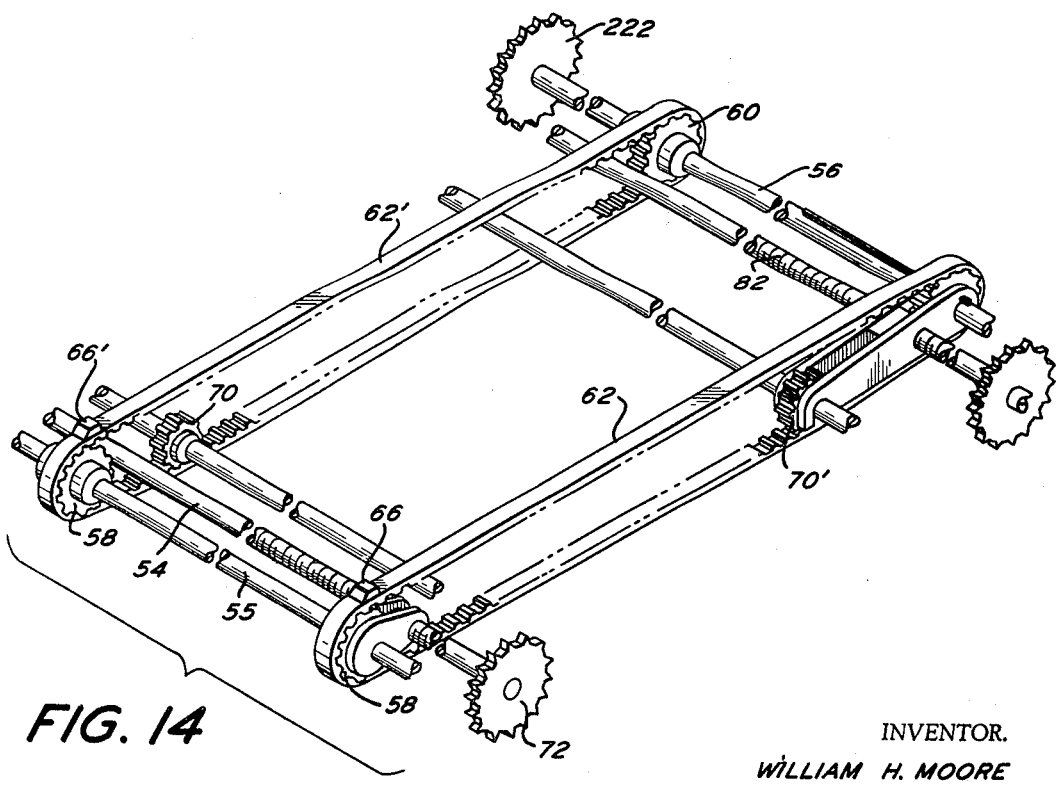

FIGURE 14 is a perspective view of the timing belt arrangement.

Figure 1:
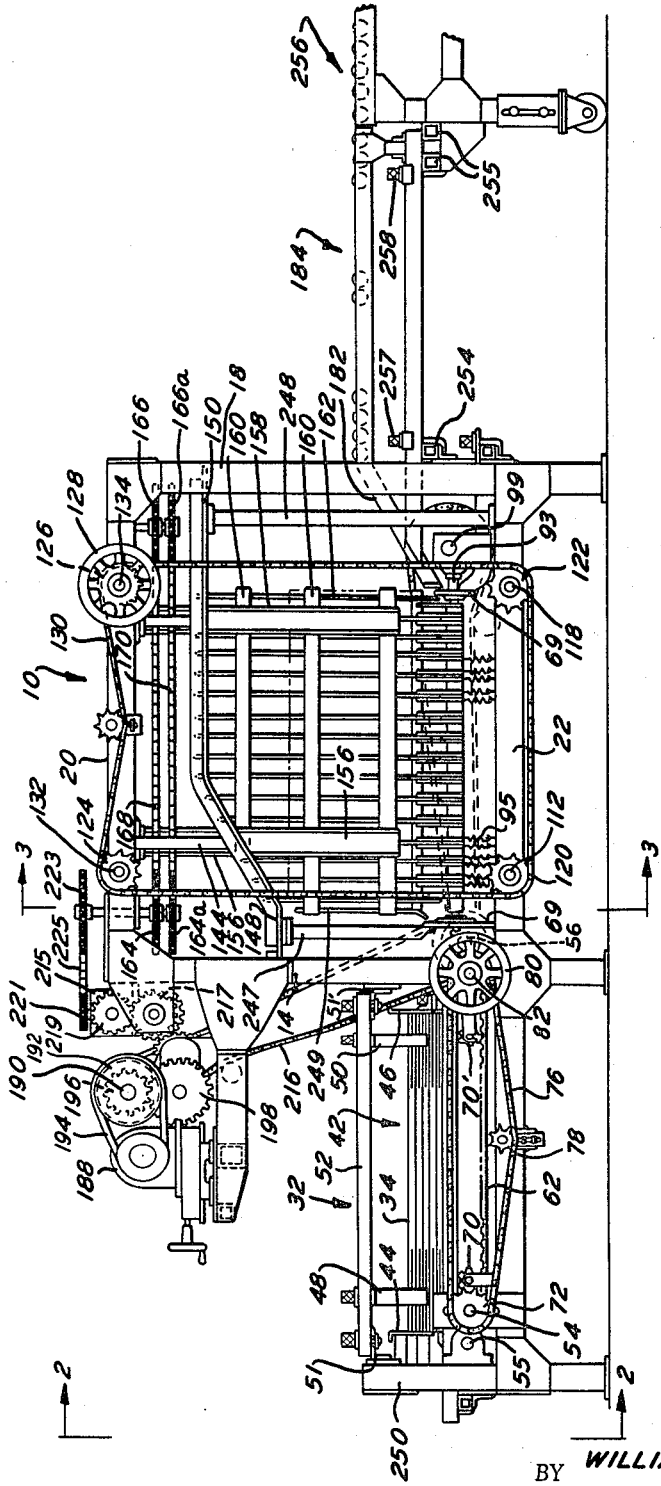
FIGURE 1 is a side elevation view of the apparatus of the present invention.

Referring to the drawings in detail, wherein like numerals indicate like elements, there is shown in FIGURE 1 a bundle counter and ejector designated generally as 10.

The apparatus 10 includes a frame which in general could assume a variety of shapes and be made from a variety of materials. As illustrated, the main componnets of the frame include front upright columns 12 and 14 interconnected with rear upright columns 16 and 18. The interconnected with rear upright columns 16 and 18. The interconnection between the columns is preferably accomplished by top cross members 20 and 24 and bottom cross members 22 and 26. The cross members or columns as illustrated are in the form of hollow rectangular tubes. Other configurations such as angle irons may be utilized if desired. The left and right sides of the apparatus 10 are interconnected with horizontally disposed top braces 28 and bottom braces 30.

Figure 2:
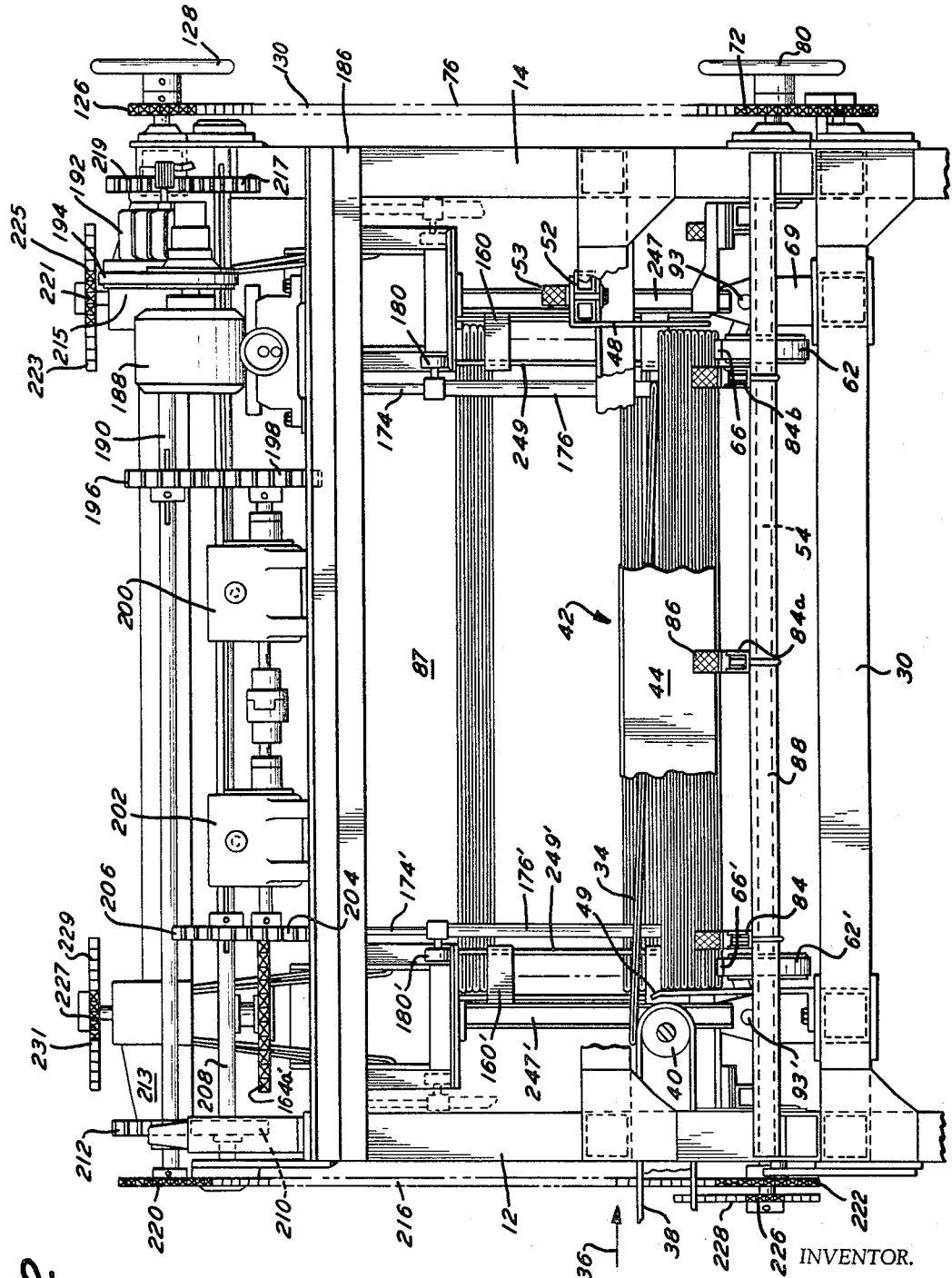
FIGURE 2 is an end elevation view as seen along the line 2—2 in FIGURE 1.
Figure 5:
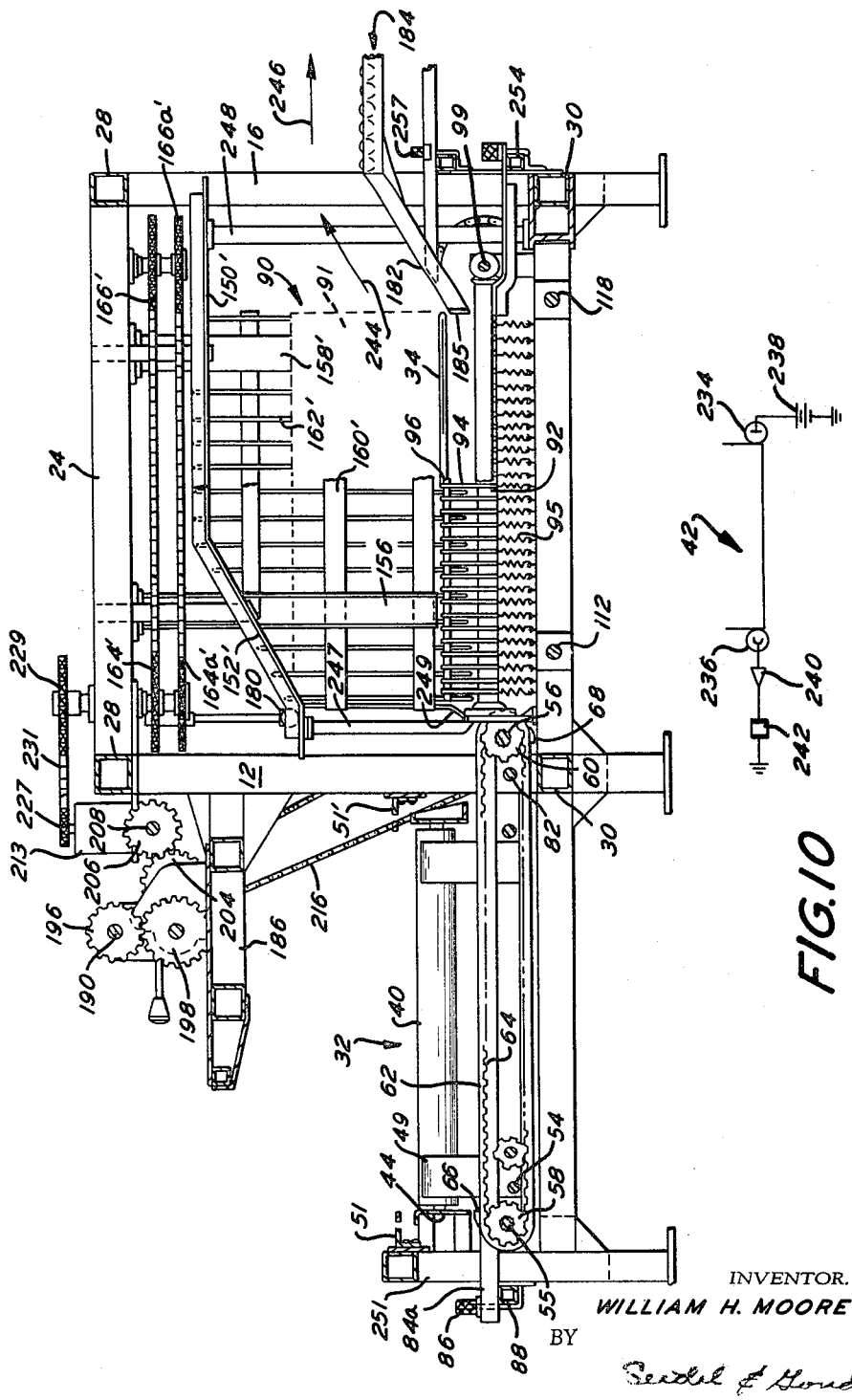
FIGURE 5 is a sectional view taken along the line 5—5 in FIGURE 4.
Figure 6:
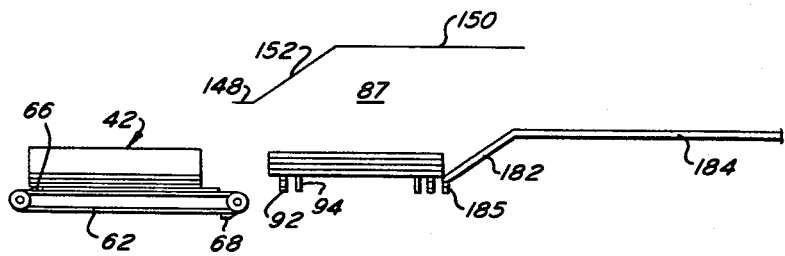
Figure 7:
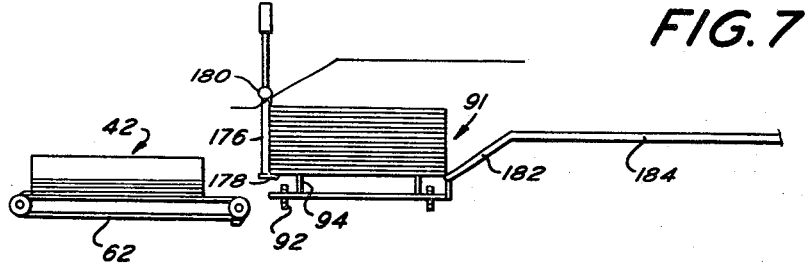
Figure 8:
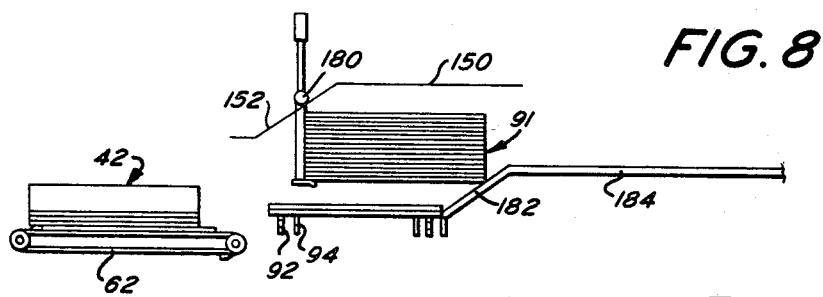
Figure 9:
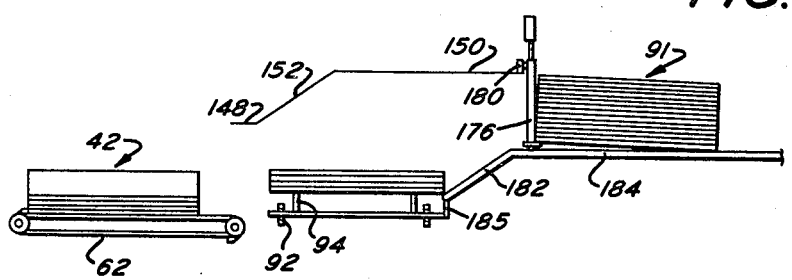

As shown more clearly in FIGURES 1, 2 and 5, the frame includes a receiving extension designated generally as 32 and disposed at the lefthand end of the apparatus as illustrated. The extension 32 includes an adjustable top-feed hopper designated generally as 42. Hopper 42 receives folded and glued or taped paperboard box blanks 34 fed thereto in the direction of arrow 36 (see FIGURE 2) by means of an endless belt 38. Belt 38 is partially disposed around and supported at one end by the roller 40.

The hopper 42 is provided with a fixed side wall 44 and an adjustable side wall 46 which are illustrated in FIGURE 1. A movable frame member 52 is provided and mounted for selective positioning at various points depending upon the size of the blank 34. Frame member 52 is adjustably supported at its ends by support rails 51 and 51'. Member 52 supports in depending relation a pair of limit stops 48 and 50 which are adjustable to any position along the length of member 52. As shown more clearly in FIGURES 1 and 2, adjustment of limit stops 48 and 50 with respect to frame member 52 may be accomplished by means of a threaded member 53 and a cooperating nut.

The limit stops 48 and 50 may be referred to as rear limit stops. Front limit stops 49 are provided immediately in front of the roller 40. Limit stops 49 are fixed with respect to the frame of the apparatus 10. As illustrated in FIGURE 2, the limit stops 48 and 50 have been adjusted with respect to limit stops 49 so as to accommodate or conform to the size of the blanks 34.

As shown more clearly in FIGURES 5 and 14, the extension 32 includes a pair of parallel spaced shafts 55 and 56. A pulley 58 is provided on shaft 55. A pulley 60 is provided on shaft 56. As will be made clear hereinafter, shaft 56 will be driven by a drive means. Each of the pulleys 58 and 60 are in meshing engagement with gear teeth in the form of ribs 64 on the inner periphery of a conventional endless timing belt 62. Pusher dogs 66 and 68 are secured to the belt 62 at diametrically opposite locations. The tension of belt 62 may be adjusted by pulley 70 and the tension of a mating timing belt 62' may be adjusted by pulley 70'.

As shown more clearly in FIGURE 2, a second belt 62' is supported adjacent the stationary front limit stops 49. The second belt and its associated mechanisms are provided with corresponding primed numerals. The second belt 62' is fixedly located. Belt 62 and its associated pulleys are adapted to be moved toward and away from the poistion of belt 62' so that the machine 10 may selectively process blanks which are smaller in size than blanks 34.

The means for facilitating adjustment of the position of belt 62 and its associated pulleys is as follows: As shown more clearly in FIGURE 1, the timing belt idler pulley shaft 55 is journaled in pillow blocks which are mounted on member 250 (and 251 not shown) and timing belt drive shaft 56 is a partly splined shaft and is journaled in pillow blocks which are mounted on member 14 (and 12 not shown).

The timing belt idler pulley 58, the belt tensioning pulley 70 and the belt drive pulley 60 are all mounted on their respective shafts so that they may be adjusted sideways simultaneously across hopper 42 to suit the size of the box blank being run.

Each of these pulleys 58, 70, and 60 is sandwiched between side plates which are reciprocally mounted on the threaded shafts 54 and 82. A sprocket 72 is fixedly secured to the right-hand end of shaft 54 in FIGURES 1 and 2. An endless member such as chain 76 extends around sprocket 72 and a sprocket (unnumbered) on shaft 82. A handwheel 80 is also secured to shaft 82. An adjustable idler sprocket 78 may be provided for adjusting the tension of chain 76. The rotation of hand wheel 80 will simultaneously rotate the threaded shafts 54 and 82 which are threaded into the solid spacer between the side plates on each side of pulleys 58, 70 and 60. These threaded shafts 54 and 82 are of the non-reciprocating type, consequently they, on rotation, cause the pulleys 58, 70 and 60 to simultaneously move sideways in the hopper 42 to suit the size box blank to be run.

When blanks 34 are received within hopper 42, they are supported by the belts 62 and 62'. The thickness of the individual blanks 34 is always slightly more than the height of the pusher dogs 66 and 66'. The lowermost edge of the side wall 44 is spaced above the plane of the belt 62 and 62' by a distance slightly greater than the thickness of the pusher dogs 66, 66', 68, and 68' so as to always clear these pusher dogs. The lowermost edge of side wall 46 is adjustable by means of shims so that it is spaced above the plane of belts 62 and 62' by a distance which is greater than the thickness of the box blank 34 that is to be run but not greater than the combined thickness of two of the type box blanks 34 that is to be run. This is done so as to clear pusher dogs 66, 66', 68 and 68' and so as to permit feeding only one blank at a time from hopper 42 into hopper 87.

A plurality of blank support rails 84, 84a, and 84b are provided. Each rail is equipped with idler rollers spaced at close intervals to support the box blanks, each rail's rollers define a supporting surface which is flush with the plane of the upper surface of the belts 62 and 62'. The support rails support the blanks 34 within the hopper 42 and absorb the weight of the stack of blanks 34 therein. The rails 84, 84a and 84b are adjustably supported at their ends for individual adjustment toward and away from each other. Thus, see FIGURE 2 and FIGURE 5 wherein the left-hand end of these rails is supported by rail 88 and adjustably secured thereto by threaded bolts 86.

Figure 3:
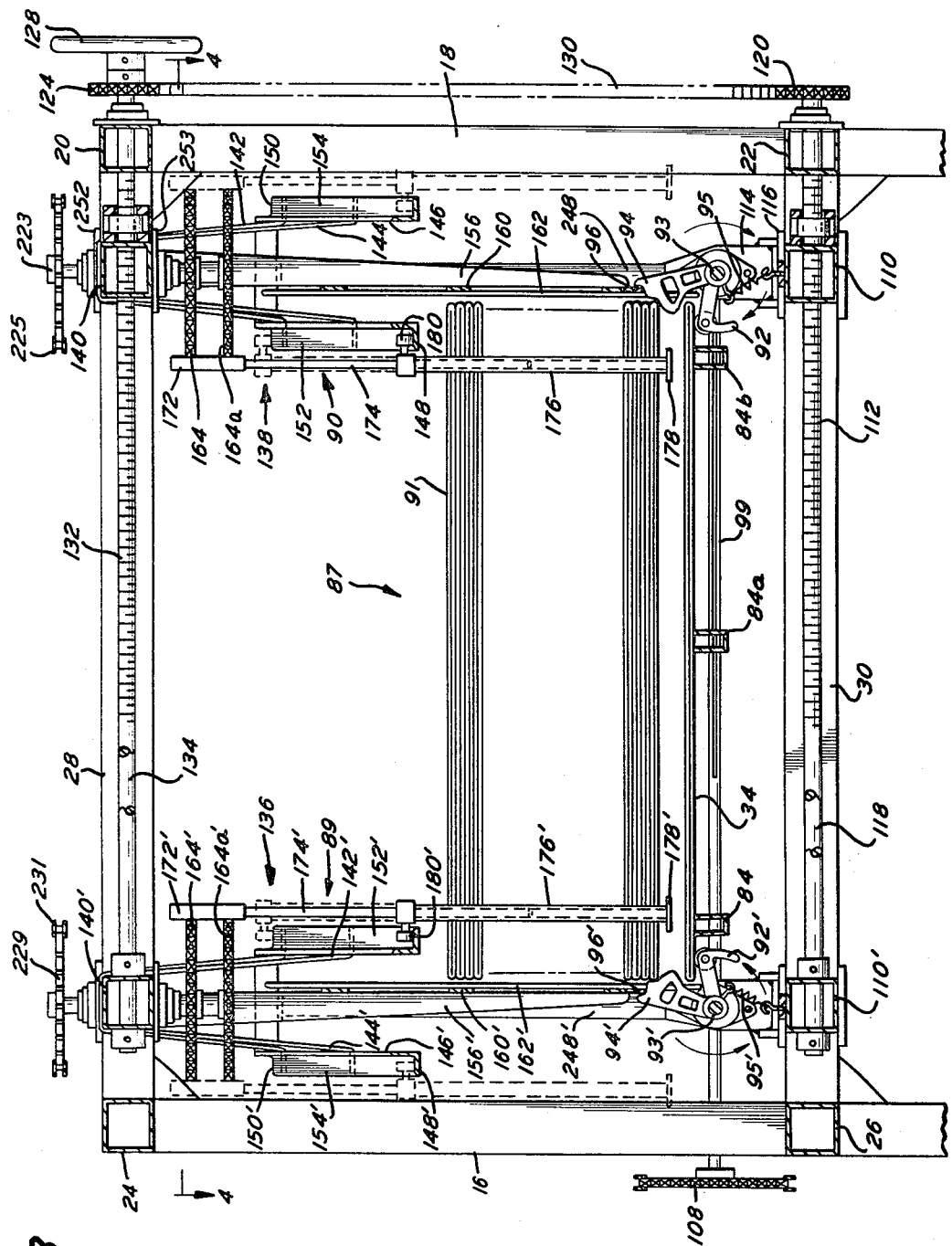
FIGURE 3 is a sectional view taken along the line 3—3 in FIGURE 1.

The hopper 42 is shallow and has a height sufficient so that it will be an auxiliary supply for box blanks. The dogs 66, 66', 68 and 68' are synchronized to continuously move blanks 34 one at a time from hopper 42 to a main hopper designated generally as 87 and shown more clearly in FIGURES 3 and 4. The hopper 87 is of the underneath feed type adapted to receive blanks 34, accumulate them into a stack 91, and dispense the blanks as a bundle having a predetermined number of blanks therein.

The hopper 87 has a left side guide and support means 89. Hopper 87 also includes a right guide and support means 90 adated to be selectively adjusted toward and away from the guide and support means 89. The left guide and support means 89 is fixedly positioned and aligned with the stationary limit stops 49. Such selective adjustment of the right guide and support means 90 is utilized when the size of the blanks 34 is changed so that the sides of hopper 87 may be adjusted as desired.

When the size of hopper 87 is properly adjusted with respect to the size of the blanks 34, blanks 34 are continuously and individually fed one at a time along the guide rails 84, 84a and 84b to the hopper 87 by the pusher dogs 66, 66' or 68 and 68'. As shown more clearly in FIGURE 3, the right guide and support means 90 includes a horizontally disposed shaft 93 having a plurality of blank lifters 92 at spaced points therealong intermediate ratchet members 94. The lifters 92 have a roller on the free end thereof to prevent scratching box blanks. Corresponding lifters and ratchet members are provided on shaft 93' of the left guide and support means 89 and provided with primed numerals. The lifters 92 are continuously rotated in a clockwise direction by shaft 93. Likewise, the lifters 92' are continuously rotated in a counterclockwise direction by shaft 93'. As the lifters 92 and 92', rotating in synchronized relationship, engage the blank 34, they lift the same thereby camming the ratchet members 94 and 94' out of the way. See FIGURE 11.

The ratchet members 94 are spring biased in a counterclockwise direction by springs 95. Ratchet members 94' are spring biased in a clockwise direction in FIGURE 3 by springs 95'. The ratchet members are not coupled to their respective support shafts, but rather have independent rotative movement with respect to their shafts. Hence, as soon as the ratchet members are cammed out of the way by the blanks 34, they immediately resume the positions illustrated in FIGURE 3 wherein they contact the sides and a small portion of the underneath surface of the blank 34. Limit stops 96 and 96' are provided for the ratchet members. However, the ratchet members preferably contact the sides of the blank before hitting their respective limit stops so as to maintain the acoustic level of the apparatus 10 at a low level. See FIGURE 12.

Figure 4:
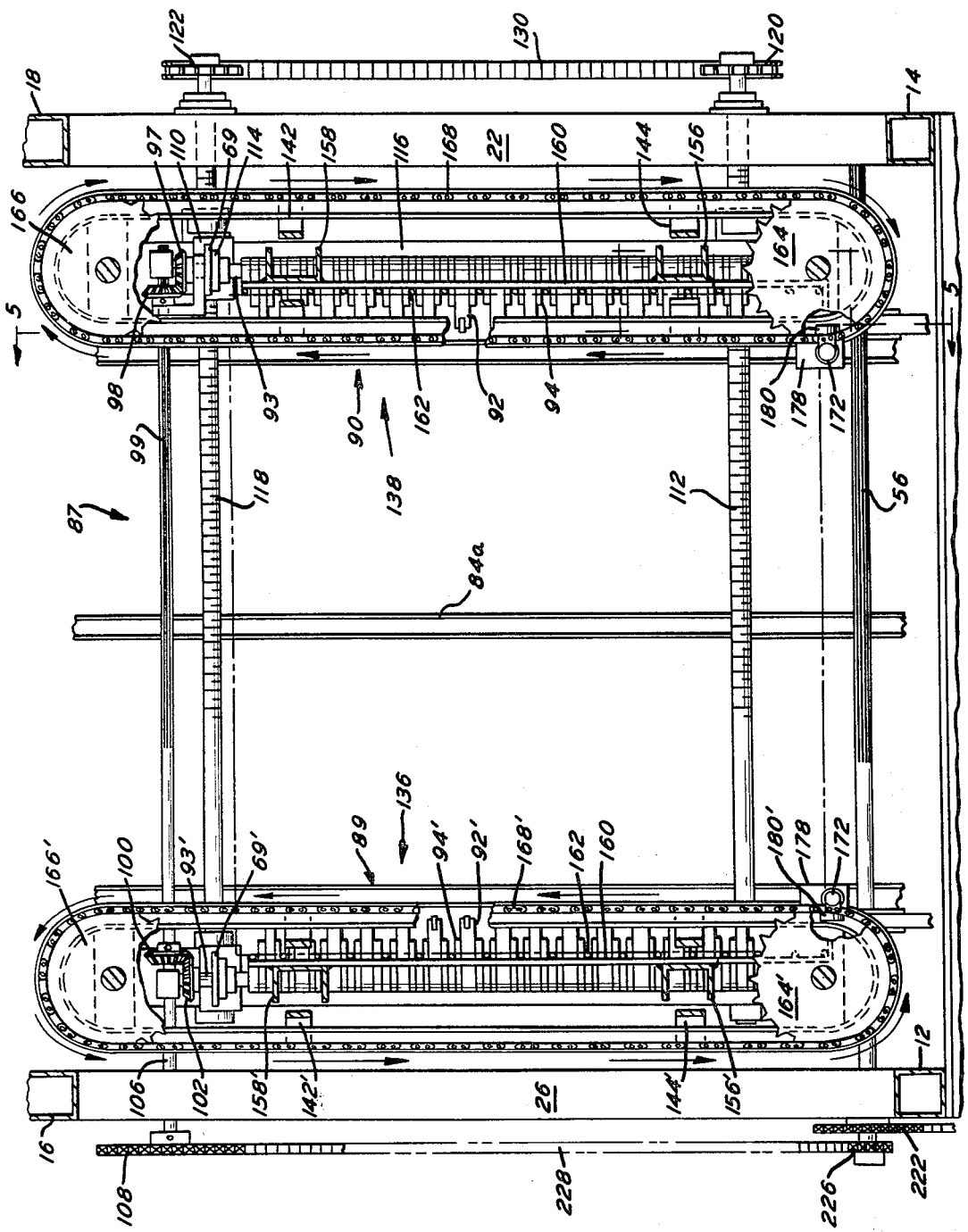
FIGURE 4 is a top plan view taken along the line 4—4 in FIGURE 3.

As shown more clearly in FIGURE 4, shaft 93 is provided at its end with a beveled gear 97. Gear 97 is in meshing engagement with a mating beveled gear 98 on shaft 99. The shaft 99 extends transversely across the apparatus 10 and is splined corresponding to the minimum and maximum width of hopper 87. The beveled gear 98 is adjustably positioned along the length of the shaft 99 simultaneously with the movement of the right side guide and support means 90 by an L-shaped member whenever adjustment for the width of the box blank is required.

A beveled gear 100 is fixedly secured to the other end of shaft 99. The gear 100 is meshingly engaged with a beveled gear 102 on the shaft 93'. Shaft 99 is coupled to a shaft 106 fixedly secured to a sprocket 108. Thus, it will be seen that the shafts 93 and 93' continuously rotate in opposite directions and will continue to do so regardless of the position of the right guide and support means 90 along the shaft 99 within the minimum and maximum widths of hopper 87.

The ends of shaft 93 are rotatably supported in bearings 114 mounted on plate 69. Bearing support plate 69 is secured to square tube member 110 which in turn extends between cross pieces 30 and is slidably supported on cross pieces 30 by an upper plate 118 and a lower plate (unnumbered), above and below cross piece 30. The square tube member 110 is threadedly coupled to the threaded shafts 112 and 118. The shafts 112 and 118 are of the non-reciprocating type having their ends rotatably supported in any suitable manner with respect to the frame. The corresponding structure for the shaft 93' is fixedly secured to the frame of the apparatus 10.

A sprocket 120 is fixedly secured to the shaft 112 and a sprocket 122 is fixedly secured to the shaft 118. The sprocket 124 is fixedly secured to one end of threaded shaft 132. A sprocket 126 is fixedly secured to one end of shaft 134. A hand wheel 128 is secured to shaft 134. A chain 130 extends around and is meshed with sprockets 120, 122, 124 and 126.

Associated with the left guide and support means 89, there is provided a lifting mechanism 136. Associated with the right guide and support means, there is provided a lifting mechanism 138. The mechanisms 136 and 138 are identical except for an arrangement whereby mechanism 138 may be selectively adjusted toward and away from mechanism 136. Only mechanism 138 will be described in detail hereinafter and primed numerals will be provided on corresponding structure of mechanism 136.

The lifting mechanism 138 includes and is suspended from the square tube member or housing 140 which extends between cross pieces 28 and is slidably supported on cross pieces 28 on each end by plates 252 above and 253 below in the same maner that square tube member 110 is supported on cross pieces 30. Shafts 132 and 134 are threadedly coupled to the housing 140 with the latter being directly above member 110. A track means 146 which has semicircular ends connected together with straight away sections is suspended from the housing 140 by support members 142 and 144 which may conveniently be in the form of metal straps.

The track 146 is additionally supported by column 247 on the infeed end of hopper 87 and by column 248 on the outfeed end of hopper 87. Column 247 extends down and is attached to bearing support 69 and column 248 extends down and is secured to square tube member 110. Columns 247 and 248 on the adjustable side of hopper 87 will therefore move with square tube member 110 when adjustment for blank size is being made. Columns 247 and 248 are so located under the track 146 that they are cleared by the box blanks entering the hopper 87 and the bundle being ejected.

The track means 146 includes a lower track level 148, an upper track level 150, with the levels interconnected by sloped portions 152 and 154. Since the track means is endless, portion 152 is preferably the portion utilized when moving from level 148 to level 150 and portion 154 is utilized when moving from level 150 to level 148.

Channel-shaped legs 156 and 158 depend from the housing 140. Horizontally disposed slats 160 are provided at spaced points along the legs 156 and 158. The slats 160 support upright guide rods 162 which form a wall for one side of the hopper 87. Slats 160 extend around the infeed end of hopper 87 to support rod 249. This rod (on each side of the infeed end of hopper 87) is bent outward on its lower end. The purpose of this bent extension is to line up the front edge of the box blanks directly underneath each other as the box blanks are lifted into the bundle. The straight part of this rod is to keep the edges of the box blanks aligned as they accumulate in hopper 87.

A pair of sprockets 164 and 164a are rotatively supported in depending relation from the housing 140, with the sprockets superimposed over one another. At its other end, housing 140 supports corresponding sprockets 166 and 166a. A chain 168 extends around and is meshed with the sprockets 164 and 166. A chain 170 extends around and is meshed with the sprockets 166a and 164a.

A stack lifter support 172 is fixedly secured to a link of each of the chains 168 and 170 for movement therewith. Support 172 has an extension 174 depending therefrom. A stack lifter 176 is telescopically supported by the extension 174 and terminates at its lower end in a foot 178. A track follower 180 is rotatably supported at the upper end of stack lifter 176. The stack lifter 176 moves upwardly telescoping over the extension 174 and vice versa as the follower 180 descends down the slope portion 154.

As shown more clearly in FIGURE 5, the righthand end of the hopper 8 includes an upwardly inclined ramp 182 which may be in the form of rails disposed at the same angle as the sloped portions 152 and 164. A conveyor 184 is provided at the upper end of the ramp 182. Conveyor 184 is provided as an exit conveyor for bundles of paperboard box blanks. Preferably, the forward end of the ramp 182 act as a limit stop 185 for the box blanks 34 as delivered to the hopper 87. The uppermost edge of limit stop 185 is slightly below the plane in which the blanks 34 are supported by the ratchet members 94 and 94'.

Referring particularly to FIGURES 2 and 5, it will be seen that a cantilever platform 186 is supported by the columns 12 and 14 in a manner so that the platform projects over the extension 32.

The motor 188 is mounted on a adjustable base and has a variable speed pulley secured to its output shaft. This combination constitutes a variable speed drive of the well known type which by means of adjusting the position of the motor base with a hand wheel, the speed of the driven machine can be varied within the desired limits.

The variable speed pulley on the motor 188 is connected to a pulley on the counter shaft 190 by means of a conventional belt 194 of the well known type used with such variable speed pulleys.

The driven pulley which rotates on counter shaft 190 is provided with a clutch 192 for the selective operation of this counter shaft.

Shaft 190 is coupled to the input side of a change gear transmission box of the spur gear type 200 by way of meshing gears 196 and 198. The output side of transmission box 200 is coupled to the input side of a second change gear transmission box of the spur gear type 202. The transmission boxes 200 and 202 are substantially identical but have different gear ratios so as to provide a wider range of gear reductions than can be obtained with a single gear transmission without incurring prohibitive costs. The transmission boxes 200 and 202 are commercially available and need not be described in detail.

The output of transmission box 202 is coupled to the shaft 208 by way of gears 204 and 206. Gear 206 is supported by shaft 208.

The lefthand end of shaft 208 in FIGURE 2 is coupled to the vertical right angle miter gear box 213 of the mechanism 136 by way of gears 210 and 212 for driving the sprockets 164' and 164a'. The righthand end of shaft 208 is coupled to the gear box 215 of the mechanism 138 by way of gears 217 and 219 for driving the sprockets 164 and 164a. The output of gear box 215 is coupled to the sprockets 164 and 164a by way of sprockets 221 and 223 coupled to a chain 225. The output of gear box 213 is coupled to the sprockets 164' and 164a' by way of sprockets 227 and 229 coupled by chain 231.

The gear box 215 is supported by an extension on the square tube member 140 for movement therewith as the mechanism 138 is adjustably moved toward the mechanism 136 when changing over from one size blank to another. To facilitate this movement, the gears 217 and 219 move with the gear box 215. Gear 219 is secured to the input shaft 219' of gear box 215. Gear 217 is splined to shaft 208 and has a rotatable bushing coupled by a non-rotatable member to the gear box 215.

A sprocket 220 is provided on the lefthand end of shaft 190. A sprocket 222 is provided on the lefthand end of shaft 56 which drives the belts 62 and 62'. A chain 216 couples the sprockets 220 and 222. As shown more clearly at the lefthand end of FIGURE 2, a sprocket 226 is provided on the shaft 56 and interconnected with the sprocket 108 by chain 228 (see FIGURE 4).

Referring with FIGURE 10, the hopper 42 is diagrammatically illustrated with photoelectric cells 234 and 236 associated therewith to detect the fact that the number of blanks 34 are below a predetermined minimum such as six blanks. Cell 234 is connected to a source of potential such as battery 238 which is grounded. Cell 236 is connected through an amplifier 240 to a relay 242 forming a part of a control circuit for the clutch 192. As soon as the number of blanks within hopper 42 drops to a minimum level of six blanks, for example, the light emitted from cell 234 is received by cell 236, and then amplified to operate relay 242 which will cause the clutch 192 to become disengaged. When the clutch 192 is disengaged, the apparatus 10 will stop. As soon as more than six blanks are present in the hopper 42, the beam of light between cells 234 and 236 is blocked thereby deactivating relay 242 and re-engaging the clutch 192. Hence, the apparatus 10 will commence operating. Accordingly, the apparatus 10 is operable independent of the rate of supply of blanks to the hopper 42.

The operation of the apparatus 10 is as follows:

It will be assumed that the apparatus described above has been properly adjusted so that the hoppers 42 and 87 conform to the size of the blank to be bundled. The motor with the variable speed pulley is adjusted manually on the sliding motor base so that the apparatus 10 processes blanks at a rate of approximately five blanks per minute faster than the folder-gluer is designed to operate for the particular size blank being processed. Inasmuch as the drive has been designed and built with gears, sprockets, etc., which have the proper ratios to permit counting and ejecting any of the preselected number of box blanks such as five, ten, fifteen, twenty, etc., the only change necessary to setup for the particular number of box blanks to be ejected is to shift to the proper gear ratios in transmission 200 and 202 by means of the gear shift levers shown.

The belts 62 and 62', the lifters 92 and 92', and the chains for the lifters 176 and 176' are all driven so as to operate in the correct timed relationship resulting from designing and building the correct gear and sprocket ratios into the machine. The specific number of box blanks which will accumulate in any bundle is the ratio of the speed of belts 62 and 62' with respect to the speed of the lifters 176 and 176'. It will be assumed that the hopper 42 contains a sufficient number of blanks so that the clutch 192 is engaged.

The shaft 56 is continuously rotating thereby driving the endless timing belts 62 and 62'. The pusher dogs on the belts transfer only the lowermost blank within hopper 42 to the hopper 87. The blanks being transferred are supported by the rails 84, 84a and 84b. The blank delivered to hopper 87 comes to rest when it engages a limit stop 185. Immediately thereafter, the continuously rotating blank lifters 92 and 92' engage the lowermost surface on the blank and lift the same upwardly thereby camming the ratchet members 94 and 94' out of the way. As soon as the blanks clear the ratchet members 94 and 94', their respective springs cause them to assume the position illustrated in FIGURE 3 so that they support the last-mentioned blank and the previously received blanks accumulating into a stack 91 within the hopper 87.

As soon as the desired number of blanks has accumulated in stack 91, the continuously moving lifters 176 will, due to the synchronized movements resulting from the geared and sprocketed relationships, be in a position wherein the feet 178 and 178' will engage the rear of the stack 91 in the space created between the box blank last lifted into the stack and the box blank entering the hopper 87 from hopper 42, then lift and move the same in the direction of arrows 244 and 246 (FIGURE 5). Thus, the lifters 176 and 176' lift and push the accumulated stack 91 up the ramp rails 182 while the track followers 180 and 180' are moving up the sloped portions 152 and 152' (see FIGURES 7 and 8). Each of the ramp rails 182 is in line with a support rail 84, 84a or 84b and is supported at one end by the support rail that it is in line with. Before losing contact with the stack 91, the rear end of the stack 91 held up by the feet 178 and 178' is slightly higher than the front end of the stack 91 as received by the conveyor 184. This assures that there will be a complete transfer of the stack to the conveyor without the feet contacting the conveyor. It is to be noted that during the ejecting of the bundle, the angle of lift and speed of ejection is such that neither the box blank being lifted to form the next bundle nor the top box blank of the bundle being formed comes into contact with the bottom box blank of the bundle being ejected during the ejection cycle.

Thereafter, the lifters 176 and 176' will continue around the track, come down the sloped portions 154 and 154', travel around the lower level 148, and eject the next stack. While the lifters 176 and 176' are ejecting a formed stack, a new stack is continuously forming therebelow. The accumulation and ejection cycle are diagrammatically illustrated in FIGURES 6–9. It is to be noted that the lifters 176 and 176', etc., in returning around the track 146 also pass around the hopper 87 formed by slats 160, the guide rods 162, 249, etc.

When the level of blanks within the hopper 42 drops below a predetermined level due to irregularity of receipt from the folder-gluer or due to the fact that the folder-gluer is inoperative, this will be detected by cell 236 receiving a beam of light from cell 234. The signal will be amplified and will activate relay 242 to disengage clutch 192. When clutch 192 is disengaged, the power to the moving or rotatable elements is interrupted. Hence, the entire apparatus 10 will become inoperative and will remain in that condition until the main power switch is turned off or until a sufficient number of blanks accumulated in hopper 42. In this manner, the stacking of box blanks within hopper 87 operates with a constant supply of box blanks fed thereto in a synchronized relationship so that a predetermined number of blanks will be stacked as a result of the synchronized relationship regardless of the nature of the supply of box blanks to the apparatus 10. The hopper 42 is relatively shallow and will contain a sufficient number of box blanks, such as twelve blanks, so as to take into consideration minor irregularities in the supply of the box blanks from the folder-gluer.

The apparatus 10 is adapted to accommodate folded blanks having a minimum width of eleven inches and a maximum width of fifty-five inches, with a minimum length of nine inches and a maximum length of forty-eight inches. The apparatus 10 is designed to accommodate folded box blanks at a rate of up to three hundred per minute while providing bundles of five, ten, fifteen, etc., box blanks in each bundle. Rapid selective conversion for the number of box blanks in each bundle may be readily achieved by manually shifting the gear ratios in gear boxes 200 and 202 with the change gear shifting handles shown. All of the hand wheels, gear boxes, transmissions, etc. are located for easy access and maintenance.

In place of photoelectric cells, load cells, switches, and the like may be substituted. Preferably, a means is provided to re-engage the clutch 192 subsequent to accumulation of a predetermined number of box blanks within the hopper 42 so that at all times the number of box blanks within hopper 42 is within a predetermined range. This will prevent the clutch 192 from being rapidly engaged and disengaged.

When changing over from processing box blanks of one size to a different size, the following adjustments should be made:

(1) The limit stops 48 and 50 should be properly adjusted along the length of frame member 52;

(2) Frame member 52 should be adjusted along the length of support rails 51 and 51';

(3) The side wall 46 should be adjusted toward or away from the fixed side wall 44;

(4) Hand wheel 80 should be rotated to properly position the belt 62;

(5) Hand wheel 128 should be adjusted to properly position members 110 and 140;

(6) Adjust the spacing between the rails 84, 84a, and 84b, the stops 185 and the ramp rails 182 and 184;

(7) And if the box blanks are less than fifteen inches wide, one of the lifters 176 and 176' may be disengaged from its respective chain drives since only one lifter would be sufficient.

The ramp rails are slidably supported on support rails 84, 84a and 84b and on the cross member 254 on the ramp end. They are supported on the other end by cross members 255 secured to take away conveyor 256. By loosening nuts 257 and 258 these rails may be adjusted sideways across the hopper 87 to suit the size box blank to be run next after adjustment the nuts 257 and 258 are tightened.

This machine has been purposely designed in such a way that the box blank lifters 92 and ratchet devices 94 that are not in use for shorter length blanks, do not require removal or disconnection because they clear all guides, etc. and their removal or disconnection would require extra set-up time.

The change-over from a different size box blank being processed frequently requires a change in the number of blanks to be accumulated in a stack for ejection. Hence, the change gear boxes 200 and 202 will also be adjusted to vary the time period for a complete cycle of the lifters 176 and 176' by merely shifting the gears in one or both of these change gear boxes manually with the shifting handle provided, to the proper ratio of input to output speed.

The ramp rails 182 and conveyor 184 must be adjusted into and out of hopper 87 to accommodate the length box blank to be run. In order to do this the nuts 257 are loosened and the take-away conveyor 256 is moved forward or backwards, which will in turn move these rails forward or backwards to suit the length of the blank to be run next. The nuts 257 are then tightened. For shorter blanks the bundle being ejected will be deposited on the conveyor 184, earlier in the ejection cycle than when full length blanks are being run.

Inasmuch as a bundle of wide blanks will sag in their center in hopper 87 between the rows of ratchets 94 on one side and the rows of ratchets 94' on the other side, the stop 185 of the center ramp rail 182 is made so that it is lower in height than the stops 185 on the two outside ramp rails. The slope of the center ramp rail will therefore be steeper because the horizontal part of all of these rails must be on the same level. With this arrangement, the center of the bundles which will sag considerably will hit the slope of the center ramp rail 182 instead of the top of the stop 185 of the center rail when the bundle starts on the ejection cycle.

Thus, it will be seen that the present invention overcomes disadvantages of the prior art while retaining the advantages thereof and provides new advantages not attainable by the prior art. The apparatus 10 is structurally interrelated in a manner to facilitate ease of maintenance and repair and can be constructed from commercially available components and materials while at the same time being versatile as to the sizes and thicknesses of corrugated paper-board box blanks which can be processed reliably and at high speeds.

Hereinafter, hopper 42 may be referred to as a first or a top feed hopper. Hooper 87 may be referred to as a second or a bottom feed hopper. As used hereinafter, the words "self-contained" refers to apparatus containing its own motor so that it is not driven by or from other devices such as a folder-gluer.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for receiving layers of sheet material and ejecting the same in bundles having a predetermined number of layers comprising a frame having a first hopper and a second hopper spaced from one another, means for transferring layers of sheet material one at a time from the first hopper directly to the second hopper, means supported by said frame in the second hopper for accumulating the layers of sheet material in a vertical stack with each layer being added to the bottom of the stack as it is received from the first hopper, and movable means supported by said frame and synchronized with said transfer means for lifting and ejecting the stack when a predetermined number of the layers have accumulated in the stack.

2. Apparatus in accordance with claim 1 including a self-contained power drive means coupled to the transfer means and the lifting means.

3. Apparatus in accordance with claim 1 including means on the frame for stopping the transfer means and for stopping the lifting means when the number of blanks in the first hopper is below a predetermined level.

4. Apparatus in accordance with claim 1 wherein said lifting means includes an endless track having horizontal upper and lower levels connected by sloped portions, and a lifter mounted for movement along the track, and drive means mounted for rotation about an upright axis for moving the lifter along the track.

5. Apparatus in accordance with claim 4 including means for moving one side wall of the second hopper together with the lifting means toward and away from an opposite side wall of the second hopper to thereby decrease the size of the second hopper as desired.

6. Apparatus for receiving folded and glued or taped paperboard box blanks and ejecting the same in bundles having a predetermined number of blanks comprising a frame, said frame having a top feed hopper and a bottom feed hopper spaced from one another, means for transferring folded box blanks one at a time from the bottom of the top feed hopper and delivering the same directly to the bottom of the bottom feed hopper, means associated with said bottom feed hopper for accumulating the blanks in a vertical stack with each blank received from the transfer means added to the bottom of a stack, and means synchronized with said transfer means for lifting and ejecting a stack of a predetermined number of blanks.

7. Apparatus for receiving folded and glued or taped paperboard box blanks and ejecting the same in bundles having a predetermined number of blanks comprising a frame, said frame having a top feed hopper and a bottom feed hopper spaced from one another, means for transferring folded box blanks one at a time from the bottom of the top feed hopper and delivering the same to the bottom of the bottom feed hopper, means associated with said bottom feed hopper for accumulating the blanks in a vertical stack with each blank received from the transfer means added to the bottom of a stack, and means synchronized with said transfer means for lifting and ejecting a stack of a predetermined number of blanks, with said lifting and ejecting means including an inclined ramp at one end of the bottom feed hopper.

8. Apparatus for receiving folded and glued or taped paperboard box blanks and ejecting the same in bundles having a predetermined number of blanks comprising a frame, said frame having a top feed hopper and a bottom feed hopper spaced from one another, means for transferring folded box blanks one at a time from the bottom of the top feed hooper and delivering the same to the bottom of the bottom feed hopper, means associated with said bottom feed hopper for accumulating the blanks in a vertical stack with each blank received from the transfer means added to the bottom of a stack, and means synchronized with said transfer means for lifting and ejecting a stack of a predetermined number of blanks, said lifting and ejecting means including a plurality of continuously rotating blank lifters and a plurality of spring biased ratchet members on opposite sides of said bottom feed hopper, each ratchet having a surface for engaging the lowermost blank of a stack for supporting the same.

9. Apparatus in accordance with claim 8 including a motor on said frame operatively coupled to a clutch which in turn is operatively coupled to said transfer means and said lifting means, and means responsive to the level of blanks in the top feed hopper for selectively disengaging the clutch when said level falls below a predetermined location.

10. In an apparatus for receiving paperboard box blanks and ejecting the same in bundles of a predetermined number of blanks comprising a bottom feed hopper having first and second opposite sides, said first side being stationary, means for selectively moving said second side toward and away from said first side, said second side including a generally endless track having a U-shaped upper level connected to a generally U-shaped lower level by sloped portions, a stack lifter having telescopic portions one of which is connected to a drive means for causing the lifter to follow said track, and said second side including means for accumulating a vertical stack of box blanks and adding each box blank received by the hopper to the bottom of the stack for ejection by said lifter.

11. An apparatus in accordance with claim 10 including a sloped ramp at one end of said hopper, the angular disposition of said ramp being substantially identical with the angular disposition of said sloped portions of said track, and said ramp being positioned to cooperate with said lifter to maintain the stack being ejected in a substantially horizontal disposition.

12. An apparatus in accordance with claim 10 wherein said first and second sides are identical.

13. An apparatus in accordance with claim 10 wherein the accumulating means for each side includes a horizontally disposed shaft, a plurality of blank lifters along each shaft for rotation therewith and a plurality of ratchet members supported by the shafts in a manner so that the members do not rotate with the shaft, means for rotating said shafts in opposite directions, and the shaft associated with said second side being simultaneously movable with said track toward and away from the first side.

14. An apparatus in accordance with claim 10 including means for selectively varying the speed of movement of the lifter along said track.

15. Apparatus in accordance with claim 14 including means for feeding the box blanks one at a time to said hopper at a uniform rate, and means for stopping said drive means in response to detection of a condition indicating that the uniform rate of feeding box blanks is about to be interrupted.

16. A method of stacking paperboard box blanks comprising the steps of accumulating box blanks in a first hopper, transferring the blanks from the first hopper at a uniform rate to a second hopper, moving the blanks in the second hopper upwardly to add them to the bottom of a vertical stack in the second hopper, and cyclically pushing the accumulated stack up an inclined ramp for ejection in timed relation with respect to the rate of transferring blanks from the first hopper to the second hopper.

17. A method in accordance with claim 16 including varying the number of box blanks in the stack to be ejected by varying the speed of the pushing cycle while maintaining the rate of transfer from the first hopper to the second hopper uniform.

18. A method in accordance with claim 16 including detecting a condition that the number of blanks in the first hopper is below a predetermined level, and generating a signal indicative thereof, and stopping said pushing cycle in response to said signal.

19. A method in accordance with claim 16 wherein said pushing cycle includes moving a combined lifter and pusher member around a generally horizontally disposed endless track having upper and lower levels interconnected by sloped portions.

20. A method in accordance with claim 16 including the step of folding the blanks and securing free ends of each blank, and feeding the folded blanks to the first hopper.

21. In an apparatus for receiving paperboard box blanks and ejecting the same in bundles of a predetermined number of blanks comprising a bottom feed hopper having first and second opposite sides, means for supporting a stack of box blanks in said hopper, means in said hopper for receiving box blanks below the stack, movable synchronized elements on said first and second sides for moving a box blank upwardly from said receiving means for addition to the bottom of the stack while providing adequate clearance space to permit receipt of the next box blank, said elements including lifters mounted for rotation about axes generally parallel to said sides, said elements being positioned for engaging only side edge portions of blanks along substantially the length of opposite side edge portions of the blanks and means for lifting and ejecting a stack of box blanks from said hopper.

22. A method in accordance with claim 16 wherein said step of moving the blanks upwardly includes continually rotating lifter arms to engage opposite side portions of the blanks for lifting the blanks, and said pushing step including moving a pair of lifter members into engagement with stacked blanks, and cyclically moving each lifter member around a generally horizontal track disposed to one side of the stack.

References Cited

UNITED STATES PATENTS

| | | | |
|---|---|---|---|
| 2,912,239 | 11/1959 | Bombard | 271—6 |
| 2,934,221 | 4/1960 | Tonna | 214—8.5 |
| 2,940,327 | 6/1960 | Gartner | 21—6.2 |
| 3,013,369 | 12/1961 | Wilson et al. | 214—6.2 |
| 3,164,270 | 1/1965 | Kinker | 214—6.2 |

FOREIGN PATENTS

| | | |
|---|---|---|
| 504,512 | 8/1930 | Germany. |
| 1,078,062 | 3/1960 | Germany. |

GERALD M. FORLENZA, *Primary Examiner.*

J. E. OLDS, *Assistant Examiner.*